United States Patent
Holenarsipur et al.

(10) Patent No.: US 9,829,350 B2
(45) Date of Patent: Nov. 28, 2017

(54) MAGNETICALLY COUPLED OPTICAL ENCODER

(71) Applicant: Apple Inc., Cupertino, CA (US)

(72) Inventors: Prashanth S. Holenarsipur, Cupertino, CA (US); Brian R. Land, Cupertino, CA (US); Karen M. Freer, Cupertino, CA (US); Alex M. Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/796,895

(22) Filed: Jul. 10, 2015

(65) Prior Publication Data

US 2016/0069712 A1 Mar. 10, 2016

Related U.S. Application Data

(60) Provisional application No. 62/048,172, filed on Sep. 9, 2014.

(51) Int. Cl.
*G01D 5/347* (2006.01)
*G01D 5/06* (2006.01)

(52) U.S. Cl.
CPC .......... *G01D 5/3473* (2013.01); *G01D 5/06* (2013.01)

(58) Field of Classification Search
CPC .. G01D 5/347; G01D 5/3473; G01D 5/34738; G01D 5/06
See application file for complete search history.

(56) References Cited

U.S. PATENT DOCUMENTS

| | | | | |
|---|---|---|---|---|
| 4,199,741 A * | 4/1980 | Serrus Paulet | ........ | H01H 36/00 335/206 |
| 4,336,446 A * | 6/1982 | Hafner | ........ | G04C 3/007 377/45 |
| 4,668,911 A * | 5/1987 | Mueller | ........ | G01D 5/06 324/207.18 |
| 5,047,629 A * | 9/1991 | Geist | ........ | G01D 5/06 250/231.1 |
| 5,382,792 A * | 1/1995 | Hurst | ........ | G01B 7/30 250/231.13 |
| 5,748,111 A * | 5/1998 | Bates | ........ | G01D 5/347 250/231.14 |
| 5,867,082 A * | 2/1999 | Van Zeeland | ........ | G01D 5/06 200/521 |
| 6,128,006 A | 10/2000 | Rosenberg et al. | | |
| 7,190,638 B2 | 3/2007 | Oguchi | | |
| 7,230,959 B2 | 6/2007 | Johnson | | |

(Continued)

FOREIGN PATENT DOCUMENTS

| | | |
|---|---|---|
| WO | WO 2009/023395 | 2/2009 |
| WO | WO 2015/034960 | 3/2015 |
| WO | WO 2015/122885 | 8/2015 |

OTHER PUBLICATIONS

U.S. Appl. No. 15/714,691, filed Sep. 25, 2017, Lin et al.

*Primary Examiner* — John Lee (74) *Attorney, Agent, or Firm* — Brownstein Hyatt Farber Schreck, LLP (57) ABSTRACT

Embodiments of the present disclosure provide an optical encoder that has magnetic elements embedded in a shaft or shaft of the optical encoder. Further, the optical encoder is hermitically sealed and is configured to rotate based on a magnetic field between the optical encoder and an actuation member.

20 Claims, 8 Drawing Sheets

(56) References Cited

U.S. PATENT DOCUMENTS

| | | | |
|---|---|---|---|
| 7,265,336 B2* | 9/2007 | Hataguchi | G01D 5/3473 250/231.13 |
| 7,385,874 B2* | 6/2008 | Vuilleumier | H01Q 1/273 343/718 |
| 7,404,667 B2 | 7/2008 | Born et al. | |
| 7,520,664 B2 | 4/2009 | Wai | |
| 7,969,337 B2 | 6/2011 | Ratnakar et al. | |
| 8,002,089 B2 | 8/2011 | Jasso et al. | |
| 8,220,987 B2 | 7/2012 | Kimura et al. | |
| 8,305,171 B2 | 11/2012 | Kimura et al. | |
| 8,350,562 B2 | 1/2013 | Gailledrat | |
| 8,577,289 B2 | 11/2013 | Schlub et al. | |
| 8,743,083 B2 | 6/2014 | Zanone et al. | |
| 8,783,944 B2* | 7/2014 | Doi | G04B 3/041 368/308 |
| 8,824,245 B2 | 9/2014 | Lau et al. | |
| 9,088,282 B2 | 7/2015 | Holenarsipur et al. | |
| 9,091,715 B2 | 7/2015 | Alameh et al. | |
| 9,188,462 B2 | 11/2015 | Omoto et al. | |
| 9,223,296 B2* | 12/2015 | Yang | G04G 17/04 |
| 9,483,031 B2 | 11/2016 | Yanagisawa | |
| 9,490,804 B2 | 11/2016 | Hanumanthaiah et al. | |
| 2003/0161360 A1* | 8/2003 | Johnson | H01S 5/141 372/20 |
| 2005/0195689 A1* | 9/2005 | Oguchi | G04C 10/02 368/47 |
| 2007/0242569 A1* | 10/2007 | Inoue | G02F 1/167 368/205 |
| 2008/0112275 A1* | 5/2008 | Born | G04C 3/004 368/319 |
| 2008/0181059 A1* | 7/2008 | Wai | G04G 21/00 368/1 |
| 2009/0160587 A1* | 6/2009 | Gailledrat | G01D 5/06 335/151 |
| 2010/0142331 A1* | 6/2010 | Kimura | G04C 3/004 368/187 |
| 2010/0282955 A1* | 11/2010 | Poon | G01D 11/245 250/231.14 |
| 2010/0309756 A1* | 12/2010 | Kimura | G04C 3/004 368/293 |
| 2013/0009816 A1* | 1/2013 | Hagita | G04R 20/02 342/357.52 |
| 2013/0076375 A1 | 3/2013 | Hanumanthaiah et al. | |
| 2013/0099107 A1* | 4/2013 | Omoto | F16C 41/007 250/231.13 |
| 2014/0086027 A1* | 3/2014 | Yanagisawa | G04G 17/045 368/278 |
| 2015/0048242 A1 | 2/2015 | Remillard et al. | |
| 2016/0058375 A1* | 3/2016 | Rothkopf | G06F 1/1643 600/301 |
| 2016/0061636 A1* | 3/2016 | Gowreesunker | G01D 5/3473 250/205 |
| 2016/0069712 A1* | 3/2016 | Holenarsipur | G01D 5/3473 250/231.13 |
| 2016/0069713 A1* | 3/2016 | Ruh | G01D 5/34715 250/231.14 |
| 2016/0258784 A1* | 9/2016 | Boonsom | G01D 5/347 |
| 2016/0313794 A1 | 10/2016 | Moussette et al. | |
| 2016/0313808 A1* | 10/2016 | Wu | G06F 3/0362 |
| 2017/0090592 A1 | 3/2017 | Ely et al. | |

\* cited by examiner

MAGNETICALLY COUPLED OPTICAL ENCODER

CROSS-REFERENCE TO RELATED APPLICATION

This application is a nonprovisional patent application of and claims the benefit to U.S. Provisional Patent Application No. 62/048,172, filed Sep. 9, 2014 and titled "Magnetically Coupled Optical Encoder," the disclosure of which is hereby incorporated herein by reference in its entirety.

FIELD

The present disclosure is directed to optical encoders for electronic devices. More specifically, the present disclosure is directed to an optical encoder that is magnetically coupled to an actuation member of an electronic device.

BACKGROUND

Many devices, including mechanical, electronic and computerized devices, may utilize various types of encoders for obtaining and collecting data about that device. Conventional optical encoders may consist of a light source that shines light onto a shaft which then reflects or otherwise enables light to shine onto a sensor. The data provided by the reflected light enables positional data and rotational data of the optical encoder to be determined.

In conventional optical encoders, the alignment between the light source, the shaft and the sensors may be difficult to maintain. For example, the shaft of the optical encoder may become misaligned due to drops, wear and tear, tolerances between components and so on. However, if the shaft becomes misaligned with the light source and/or the sensor, the data that represents the positional data of the shaft becomes less accurate.

It is with respect to these and other general considerations that embodiments of the present disclosure have been made. Although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure are directed to an optical encoder that is hermitically sealed within an enclosure. The optical encoder includes a shaft and a first magnetic field source rigidly coupled to the shaft. When the first magnetic field source rotates, such as, for example, in response to a received magnetic field, rotation of the first magnetic field source causes the shaft to rotate about its axis.

Also disclosed is an electronic device comprising an enclosure with an optical encoder at least partially affixed to an interior sidewall of the enclosure. The optical encoder includes a shaft, a first magnetic field source rigidly coupled to the shaft, an optical emitter and an optical detector. In certain embodiments, when the first magnetic field source rotates, such as, for example, in response to a received magnetic field, rotation of the first magnetic field source causes the shaft to rotate about its axis.

A method for rotating an optical encoder disposed within a housing of an electronic device is also disclosed. According to this method, an actuation member having a first magnetic field source is rotated. In certain embodiments, the actuation member is perpendicular to an outer sidewall of the housing of the electronic device. In response to rotating the actuation member, a shaft disposed within the housing is rotated about its axis. The shaft may include a second magnetic field source that is magnetically coupled to the first magnetic field source. As the actuation member and the shaft rotate, the direction of movement and the speed of movement of the shaft may be determined.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Various embodiments are described more fully below with reference to the accompanying drawings, which form a part hereof, and which show specific example embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

In various electronic devices, rotational and/or axial movement of a component (e.g., a crown) of the electronic device may need to be determined. In such instances, an optical encoder may be used to detect the rotational and axial movement of the component. For example, the optical encoder of the present disclosure includes a light source that shines on a shaft (or a wheel) of the optical encoder. The shaft may include an encoding pattern, such as, for example, a collection of light and dark lines that are arranged in a particular sequence or in a particular pattern.

When the light from the light source hits the encoding pattern, the encoding pattern modulates the light and reflects it onto one or more sensors or optical detectors. The sensors process or measure the reflected light and a determination may subsequently be made as to the direction, speed and movement (rotational and/or axial) of the shaft. In certain embodiments, the one or more sensors may be an array of photodiodes.

In some cases, the accuracy of the optical encoder may be affected by an alignment of the shaft of the optical encoder with respect to the light source and/or the sensors. For example, if the shaft of the optical encoder is misaligned or aligned at an angle with respect to the light source or the sensor, the sensors of the optical encoder may not be able to determine the correct rotation and/or position of the shaft. Furthering the example, if the shaft of the optical encoder is positioned at an angle with respect to the light source and photodiode array, as the shaft rotates, the encoding pattern on the optical encoder moves across the light source and photodiode array at different speeds (e.g., the portion of the shaft that is closer to the light source and/or the sensor in the z-plane moves across the sensor faster than the portion of the shaft that is farther away from the light source and/or the light sensor in the z-plane). As such, the movement of the shaft may not be accurately determined.

In another example, if the shaft of the optical encoder is positioned at an angle that is directed away from the light source and the sensor, the sensor may not receive a sufficient amount of reflected light to properly determine a rotation of the shaft. If however, the shaft of the optical encoder is positioned at an angle that is directed toward the light source and the sensor, the sensor may receive too much reflected light and become saturated. Saturation of the sensor may also cause readings of the rotation of the shaft to be inaccurate.

In order to address these concerns, among others, embodiments of the present disclosure describe an optical encoder that is magnetically coupled to an actuation member of an electronic device. For example, a shaft of the optical encoder may have a plurality of magnetic elements embedded therein. Likewise, the crown, or other actuation member of the electronic device may also have a plurality of magnetic elements coupled therein. In some embodiments and as will be described in detail below, the plurality of magnetic elements in the actuation member interact with the plurality of magnetic elements coupled to the shaft of the optical encoder. Thus, as the actuation member turns or is otherwise actuated, the magnetic force between the magnetic elements in the actuation member and the magnetic elements in the shaft of the optical encoder causes the shaft to rotate.

In some embodiments, the shaft of the optical encoder, along with the light source and the sensor, may be hermitically sealed in an enclosure. As such, the magnetic coupling between the actuation member and the shaft may occur through one or more sidewalls of the enclosure and/or one or more sidewalls of a housing of an electronic device in which the optical encoder is used.

Figure 1:
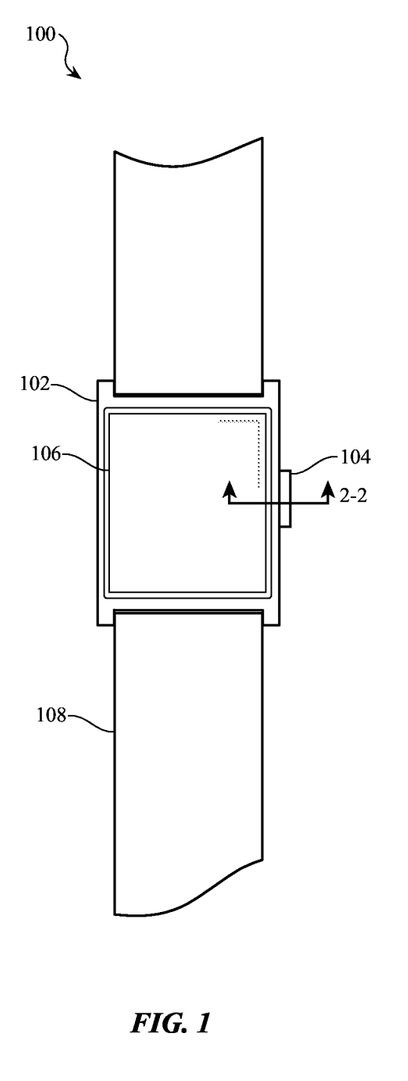
FIG. 1 illustrates an example electronic device according to one or more embodiments of the present disclosure.

FIG. 1 illustrates an example electronic device 100 according to one or more embodiments of the present disclosure. The electronic device 100 may be a portable computing device. Examples of portable computing devices include cell phones, smart phones, tablet computers, laptop computers, time-keeping devices, computerized glasses and other wearable devices navigation devices, sports devices, accessory devices, health-monitoring devices, medical devices and the like. In one example and as shown in FIG. 1, the electronic device 100 may be a wearable electronic device. The electronic device 100 may include a housing 102 as well as a display 106, and a crown 104. Although specific components are shown and mentioned, the electronic device 100 may contain other components such as, for example, buttons or other input mechanisms.

The display 106 of the electronic device 100 may be a touch-sensitive display having an input area. The input area may cover the entire display 106 or substantially all of the display 106. In another embodiment, the input area may cover only a portion of the display 106. The display 106 may be configured to output a user interface that displays information about the electronic device 100 as well as other information that is stored in a memory 110 of the electronic device 100. For example, the user interface may present information corresponding to one or more applications that are being executed on the electronic device 100. Such applications may include a time keeping application, an email application, a phone application, a calendaring application, a game application, a health monitoring application and so on.

The input mechanism of the electronic device, such as, for example, the crown 104, may be used to select, adjust or change various images that are output on the display 106. For example, if the display 106 of the electronic device 100 is displaying a time keeping application, the crown 104 may be rotated in either a clockwise or counterclockwise direction to change or adjust the position of the hands or the digits that are displayed for the time keeping application. In another embodiment, the crown 104 may be rotated to move a cursor or other type of selection mechanism from a first displayed location to a second displayed location in order to select an icon or move the selection mechanism between various icons that are output on the display 106. Likewise, the crown 104 may be pushed or pressed in a linear direction to provide another input to the electronic device 100.

As shown in FIG. 1, the electronic device 100 may also include a band 108 that may be used to secure or attach the electronic device 100 to a user. Other attachment mechanisms, such as, for example, a strap, a lanyard or other such attachment mechanism may also be used.

Figure 2:
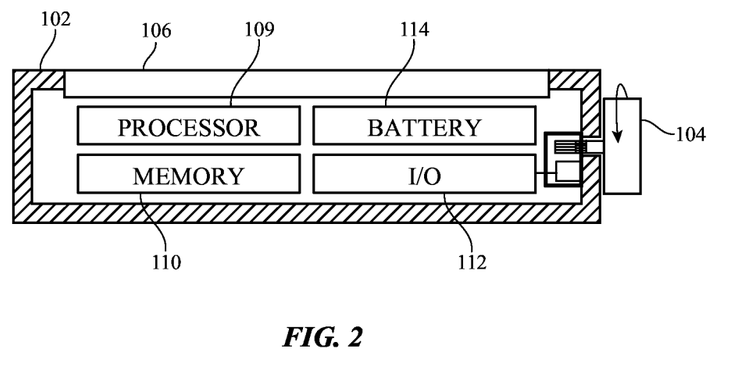
FIG. 2 illustrates a cross-section view of the electronic device of FIG. 1 taken along line 2-2 of FIG. 1 according to one or more embodiments of the present disclosure.

FIG. 2 illustrates a cross-section view of the electronic device 100 of FIG. 1 taken along line 2-2 according to one or more embodiments of the present disclosure. As shown in FIG. 2, the electronic device 100 may include various additional components that assist in the overall operation of the device 100. For example, the electronic device 100 may include a processor 109, a memory 110, a battery 114 and various input and output components 112. In certain embodiments, the input and output components 112 may include a sensor, a microphone, a camera, speakers, dials, buttons and so on.

The input and output component 112 may receive input from the optical encoder of the present disclosure. More specifically, as the crown 104 rotates, such as, for example, in the direction of the arrow shown in FIG. 2, light from the light source associated with optical encoder is reflected off of an encoding pattern on the shaft of the optical encoder and is received by one or more sensors. The sensors may then process the rotation information (such as, for example, by detecting a change in luminance or intensity of the reflected light) and provide it to the input and output component 112 and/or the processor 109 to determine whether the images output on the display 106 are to be updated.

In some cases, the electronic device 100 may include one or more components that enable the electronic device 100 to connect to the Internet and/or access one or more remote databases or storage devices. The electronic device 100 may also enable communication over wireless media such as acoustic, radio frequency (RF), infrared, and other wireless media mediums. Such communication channels may enable the electronic device 100 to remotely connect and communicate with one or more additional devices such as, for example, a laptop computer, a tablet computer, a mobile telephone, a personal digital assistant, a portable music player, speakers and/or headphones and so on.

The electronic device 100 may also include one or more communication interfaces. The communication interfaces can provide electronic communications between the electronic device 100 and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The electronic device 100 may provide information regarding time, health, statuses or externally connected or communicating devices and/or software executing on such devices, messages, video, operating commands, and so forth (and may receive any of the foregoing from an external device), in addition to the electronic communications.

Figure 3:
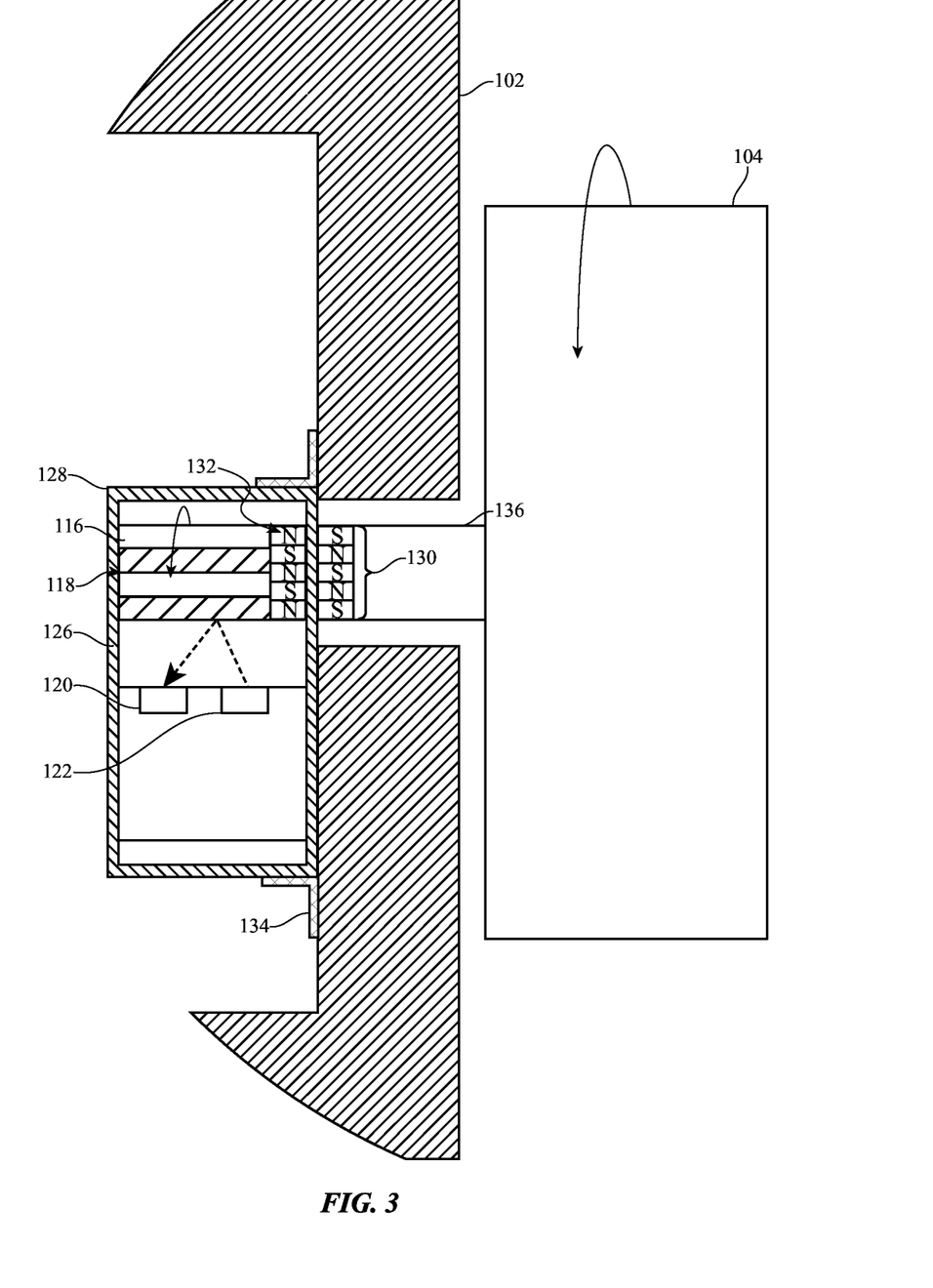
FIG. 3 illustrates an example optical encoder and crown assembly according to one or more embodiments of the present disclosure.

FIG. 3 illustrates an example optical encoder 128 of an electronic device, such as, for example, electronic device 100 discussed above. As shown in FIG. 3, the optical encoder 128 may include a shaft 116, a light source 122 and a photodiode array 120. Although a photodiode array 120 is specifically mentioned, embodiments disclosed herein may use various types of sensors or optical detectors that are arranged in any number of configurations for detecting the movement of the shaft 116. For example, the movement of the shaft 116 may be detected by an image sensor, a light sensor such as a CMOS light sensor or imager, a photovoltaic cell or system, a photo resistive component, a laser scanner and the like.

The light source 122 of the electronic device 100 may be any type of emitter that provides light in response to a received current. In addition, the light from the light source should be a type that can be reflected off of the shaft 116, and more specifically an encoding pattern 118 on the shaft 116, and subsequently received by the photodiode array 120. For example, the light source 122 may be an LED, an infrared light such as, for example an infrared LED, a laser diode, a light bulb and any other such light source.

In some cases, the shaft 116 may be placed on a spindle (not shown) that enables the shaft 116 to rotate about its axis. When present, the spindle may be coupled to one or more sidewalls of a housing portion of the electronic device such that the shaft 116 is perpendicularly aligned with, or otherwise rotates about an axis that is perpendicular with the sidewalls of the housing portion. The shaft 116 may also include an encoding pattern 118. The encoding pattern 118 may be used to determine positional information about the shaft 116 including rotational movement, angular displacement and movement speed. In certain embodiments, the encoding pattern 118 may include a plurality of light and dark stripes axially arranged along the shaft 116. The light and dark stripes of the encoding pattern 118 may be arranged in various combinations, shapes and so on.

Although light stripes and dark stripes are specifically mentioned, the encoding pattern 118 may consist of various types of stripes having various shades or colors that provide surface contrasts. For example, the encoding pattern 118 may include a stripe or marking that has a high reflective surface and another stripe that has a low reflective surface regardless of the color or shading of the stripes or markings. In another embodiment, a first stripe of the encoding pattern may cause specular reflection while a second stripe of the encoding pattern may cause diffuse reflection. When the reflected light is received by the photodiode array, a determination may be made as to the position and movement of the shaft 116. For example, a detected change in luminance or intensity of the reflected light may indicate movement of the shaft 116. In embodiments where a holographic or diffractive pattern is used, the light from the light source will diffract from the shaft. Based on the diffracted light, the photodiode array may determine the position, movement and direction of movement of the shaft.

In some embodiments, the stripes of the encoding pattern 118 extend axially along the shaft 116. The stripes may extend along the entire length of the shaft 116 or partially along a length of the shaft 116. In addition, the encoding pattern 118 may also be disposed around the entire circumference of the shaft 116. In other embodiments, the encoding pattern 118 may include a radial component. In yet other embodiments, the encoding pattern may have both a radial component and an axial component. Such examples include diagonal lines, square wave and/or sine wave type lines and so on.

As discussed above, the optical encoder 128 may be used to determine positional data of the crown 104. More specifically, the optical encoder 128 may be used to detect movement of the crown 104 including the direction of the movement, speed of the movement and so on. Once the movement data of the crown 104 is determined, one or more graphics, images or icons on the display 106 of the electronic device 100 may be updated or altered accordingly.

For example, continuing with the time keeping application example discussed above, the crown 104 may be rotated in a clockwise manner in order to change the displayed time. The optical encoder of the present disclosure will detect the original starting position of the crown 104, the rotational movement of the crown 104 in the clockwise direction, and will also detect the speed at which the crown 104 is being rotated. As a result, the displayed hands of the time keeping application may rotate or otherwise move in a similar direction and speed.

In certain embodiments, the optical encoder 128 may be contained within an interior housing of the electronic device. More specifically, the optical encoder may be partially or entirely contained within an enclosure 126. For example, the shaft 116, the light source 122 and the photodiode array 120 may all be placed within the enclosure 126 such that each of these components are hermetically sealed within the enclosure 126. As such, the enclosure 126 protects the components of the optical encoder 128 from damage, water, dust, and other contaminants. In certain embodiments, the enclosure 126 may be opaque and may be made of glass, fiberglass, plastic or other such materials that would enable the components of the optical encoder 128 to be hermetically sealed within the enclosure 126.

The enclosure 126 may be coupled to the housing 102 using one or more securement mechanisms 134. The securement mechanisms 134 may be used to ensure that the enclosure 126 is stationary with respect to the housing 102. More specifically, the enclosure 126 may be stationary while the shaft 116 of the optical encoder 128 is able to rotate about its axis due to one or more magnetic field forces that are applied to the shaft 116.

Because the optical encoder 128 is contained within the enclosure 126, the shaft 116 may also include a plurality of magnetic elements 132 (or magnetic field sources) disposed on at least one end. The magnetic elements 132 may be embedded in or otherwise coupled to the shaft 116. Further, the magnetic elements may be coupled to or embedded in the shaft 116 using a variety of different orientations, patterns, alignments and so on, some of which are shown below with respect to FIGS. 5A-5D.

In certain embodiments, each of the magnetic elements 132 of the shaft are configured to align with or otherwise be magnetically coupled to corresponding magnetic elements 130 (or a magnetic field source) disposed on an actuation member 136 of the electronic device. In some embodiments, the actuation member 136 is part of the crown 104 of the electronic device and may extend through a housing 102 of the electronic device. In other embodiments, the crown 104 may be the actuation member 136. In still yet other embodiments, the actuation member 136 may be a trackball, movable button, or other such input mechanism.

Because the shaft 116 and the actuation member 136 are separate pieces that may be magnetically coupled during assembly of the electronic device, large alignment tolerances that may be present in conventional encoder systems (e.g., two piece encoder systems in which the shaft is coupled to the crown) are significantly reduced. Further, in such conventional encoder systems, the shaft and the sensor or the photodiode array 120 may not be paired until final assembly. However, because the shaft 116 and the photodiode array 120 are hermetically sealed prior to final assembly, pairing of the shaft 116 and the photodiode array 120 may occur prior to final assembly. Once the shaft 116 and the photodiode array 120 have been paired and calibrated (and the performance characteristics verified), the actuation member 136 may subsequently be magnetically coupled to the shaft 116 through the enclosure 126.

In addition, the alignment between shaft 116, the light source 122 and the photodiode array 120 may be smaller in the z-plane than is typically required in conventional optical encoders. For example, because the shaft 116 is not physically attached to an actuation member 136 that has various tolerances (which may cause the shaft 116 to be positioned at various angles with respect to the photodiode array 120) the shaft may have a planar alignment with respect to the photodiode array 120 than in conventional encoders. More specifically, the magnetic coupling between the shaft 116 and the actuation member 136 may cause the shaft 116 to be perpendicular with respect to a sidewall of the enclosure 126 which thereby causes the shaft 116 to have a planar alignment with respect the light source 122 and the photodiode array 120 as the shaft 116 is aligned with respect to the sidewall instead of another rotatable mechanism. As a result, when the shaft 116 rotates, the spacing between the shaft 116 and the other components of the optical encoder may stay relatively constant.

Referring back to FIG. 3, the actuation member 136 (or the crown 104) may include an array of magnetic elements 130 disposed on at least one end. In some cases, the magnetic elements 130 may be embedded within the actuation member 136. In another embodiment, the magnetic elements 130 may be coupled to at least one end (e.g., a proximal end and/or a distal end) of the actuation member.

Further, the magnetic elements 130 on the actuation member 136 may be configured to be magnetically coupled to the magnetic elements 132 disposed on the shaft 116. In such embodiments, the actuation member may be at least partially coupled to an outer sidewall of the enclosure 126. Further, the actuation member 136 may be perpendicularly aligned with, or otherwise rotated about an axis that is perpendicular with the outer sidewalls of the enclosure 126.

When the magnetic coupling between the actuation member 136 and the shaft 116 has occurred, movement of the crown 104 (and ultimately the actuation member 136) in a given direction causes the shaft 116 to rotate in the same direction. For example, a magnetic force caused by the magnetic coupling between the array of magnetic elements 130 on the actuation member 136 and the array of magnetic elements 132 on the shaft 116 causes the shaft 116 to rotate in the same direction as the crown 104.

As discussed above, as the shaft 116 rotates, light from the light source 122 is reflected off of the encoding pattern 118 and received by the photodiode array 120. A processor of the electronic device may then determine directional movement and speed of the shaft 116 and adjust displayed content accordingly.

Figure 4A:
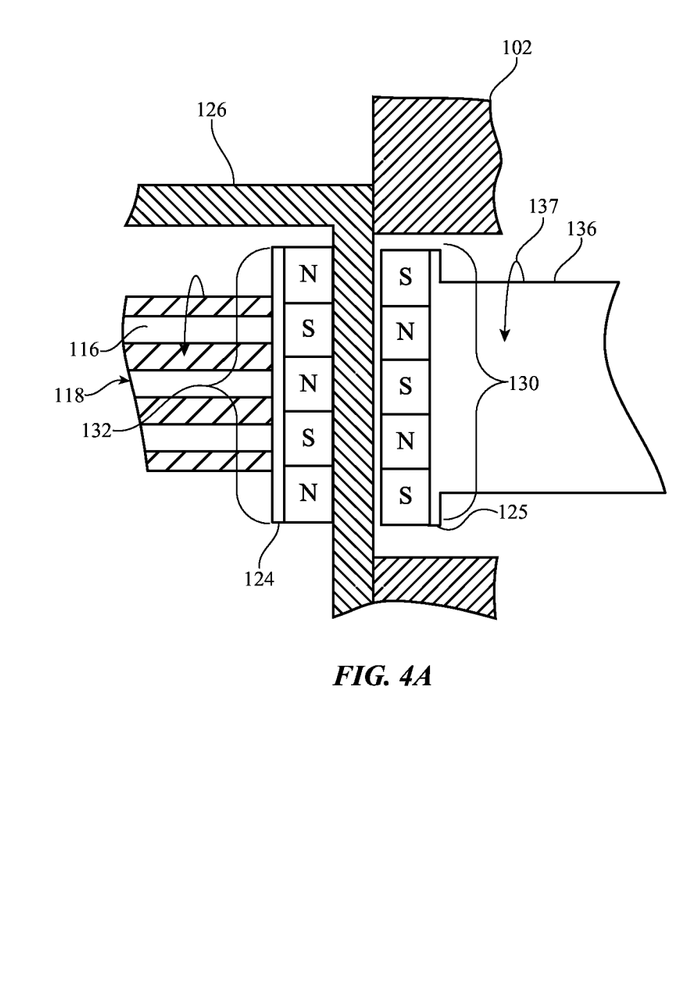
FIG. 4A illustrates an example shaft of an optical encoder and an associated actuation member according to one or more embodiments of the present disclosure.

FIG. 4A illustrates a shaft 116 of an optical encoder and an associated actuation member 136 according to one or more embodiments of the present disclosure. In certain embodiments, the shaft 116 and the actuation member 136 may be similar to the shaft 116 and actuation member 136 described above.

As previously discussed, the shaft 116 may include an encoding pattern 118 that is used to determine movement of the shaft 116. The shaft 116 may include an array of magnetic elements 132 disposed on at least one end of the shaft 116. The array of magnetic elements 132 may be electromagnets, permanent magnets, or other types of magnets that generate or cause a magnetic field.

The shaft 116 may also include a flange 124 disposed on at least one end. In embodiments where the flange 124 is present, the array of magnetic elements 132 may be coupled to or embedded within the flange 124. In some embodiments, the flange 124 may also be integrated with the shaft 116. In another embodiment, the flange 124 may be coupled to the shaft 116.

In certain embodiments, each of the magnetic elements in the array of magnetic elements 132 may have alternating polarities. For example, a first magnetic element of the array of magnetic elements 132 may have a first polarity while a second magnetic element in the array of magnetic elements 132 has a second, different polarity. Although the magnetic elements in the array of magnetic elements 132 are shown having various polarities, the array of magnetic elements 132 may be arranged in various configurations.

Likewise, the actuation member 136 may also have an array of magnetic elements 130 disposed thereon. Like the array of magnetic elements 132 that are associated with the shaft 116, the array of magnetic elements 130 of the actuation member 136 may be comprised of electromagnets, permanent magnets, and so on. In addition, the array of magnetic elements 130 may be coupled to the flange 125 or be integrated with the flange 125.

Further, the array of magnetic elements 130 may be arranged in alternating polarities or otherwise configured to be magnetically coupled to the array of magnetic elements 132 disposed on the shaft 116. For example and as shown in FIG. 4A, the first magnetic element in the array of magnetic elements 130 of the actuation member 136 may have a first polarity while the first magnetic element in the array of magnetic elements 132 of the shaft 116 may have a polarity that is opposite from the first polarity. Thus, each magnetic element may be attracted to the other and accordingly, be used to complete the magnetic coupling between the shaft 116 and the actuation member 136.

This pattern may continue for each magnetic element in both the array of magnetic elements 130 and the array of magnetic elements 132 to create a magnetic coupling between the components. Although specific patterns and arrangements of magnetic elements are shown and described, other arrangements are contemplated.

As discussed above, the shaft 116 may be enclosed within an enclosure 126. In some embodiments, the enclosure is part of the housing 102 of the electronic device. In other embodiments, the enclosure 126 is coupled to an interior sidewall of the housing 102. As also discussed above, the enclosure 126 is configured to hermetically seal the shaft 116 and its associated array of magnetic elements 132, as well as the light source and optical encoder within the enclosure 126. As such, the magnetic coupling (and the magnetic force) between the array of magnetic elements 132 on the shaft 116 and the array of magnetic elements 130 on the actuation member 136 must be strong enough to pass through one or more sidewalls of the enclosure 126. Further, the shaft 116 may be configured to be at least partially coupled to an interior sidewall of the enclosure 126 (using, for example a spindle that enables the shaft 116 to rotate about its axis). Likewise, the actuation member 136, or a portion of the actuation member 136, may be configured to be at least partially coupled to an exterior sidewall of the enclosure 126 and/or a portion of the housing 102 to prevent the crown 104 and/or the actuation member 136 from being removed from the housing 102.

Due to the magnetic coupling between the shaft 116 and the actuation member 136, when the actuation member 136 is rotated in a given direction, such as, for example in the direction of arrow 137, the shaft 116 will also move in the same direction. Thus, although the actuation member 136 is outside of the hermetically sealed enclosure 126, the actuation member 136 may control movement of shaft 116 that is entirely contained within the hermetically sealed enclosure 126.

Figure 4B:
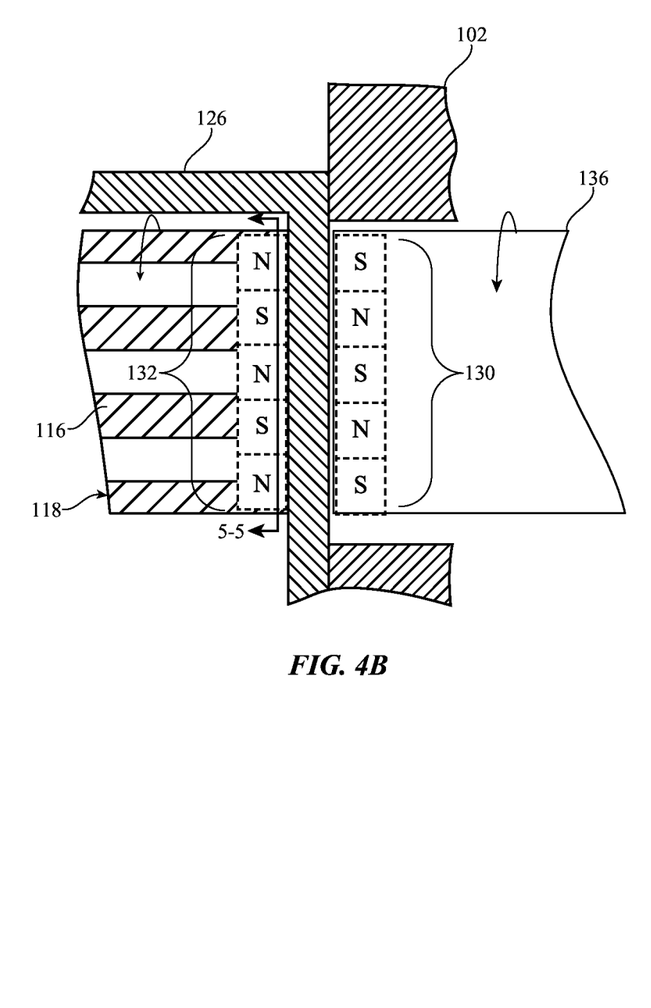
FIG. 4B illustrates an example shaft of an optical encoder and an associated actuation member according to one or more alternative embodiments of the present disclosure.

FIG. 4B illustrates a shaft 116 of an optical encoder and an associated actuation member 136 according to one or more alternative embodiments of the present disclosure. More specifically, FIG. 4B illustrates that the array of magnetic elements 132 of the shaft 116 and the array of magnetic elements 130 of the actuation member 136 may be embedded within the shaft 116 and the actuation member 136 respectively. However, regardless of whether the magnetic elements are embedded within, or external to, the shaft 116 and the actuation member 136 respectively, the magnetic coupling of the shaft 116 and the actuation member 136 causes the shaft 116 to move in a similar manner (including a particular direction and with a particular speed) as the actuation member 136 such as described above.

FIGS. 5A-5D illustrates various arrangements of an array of magnetic elements of a shaft of an optical encoder according to one or more embodiments of the present disclosure. More specifically, FIGS. 5A-5D illustrate example arrangements of magnetic elements taken along cross-section 5-5 of FIG. 4B. Further, although the cross-section 5-5 is illustrated being taking along the shaft 116, a similar cross-section may be taken with respect to the actuation member 136. As such, each of the arrangements discussed below, as well as various combinations and alterations to the arrangements, may be used with respect to the shaft 116 and the actuation member 136.

Figure 5A:
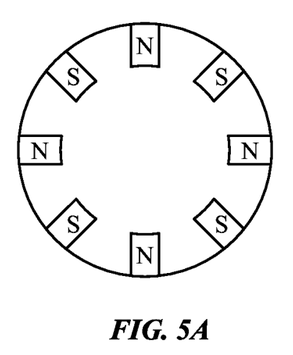
FIG. 5A illustrates a first arrangement of magnetic elements on a shaft of an optical encoder according to one or more embodiments of the present disclosure.

FIG. 5A illustrates a first example arrangement of magnetic elements in which the magnetic elements of the array alternate polarities around a circumference of the shaft. In some embodiments, the magnetic elements may be embedded within the shaft or may be coupled to an end of the shaft. In still yet other embodiments, the magnetic elements may be coupled to or embedded within a flange that is either part of, or coupled to the shaft.

Figure 5B:
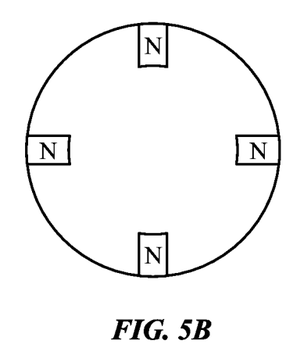
FIG. 5B illustrates a second arrangement of magnetic elements on a shaft of an optical encoder according to one or more embodiments of the present disclosure.

FIG. 5B illustrates a second example arrangement of magnetic elements according to one or more embodiments of the present disclosure. As shown in FIG. 5B, the array of magnetic elements may each have the same polarity. Thus, in order to magnetically couple the shaft to the actuation member, the array of magnetic elements in the actuation member must have a polarity that is opposite the polarity of the magnetic elements in the shaft.

In alternative embodiments, the array of magnetic elements in the shaft and the actuation member may have the same polarity and thus, be repulsive with respect to one another (rather than attracted to one another). In such embodiments, the array of magnetic elements in the actuation member may need to be offset from the array of magnetic elements in shaft. However, when the actuation member is rotated, rotation of the array of magnetic elements of actuation member exerts a repulsive force on the array of magnetic elements in the shaft which causes the shaft to rotate in the same direction.

In some embodiments, the array of magnetic elements shown in FIG. 5B may be embedded within the shaft or may be coupled to an end of the shaft. In still yet other embodiments, the array of magnetic elements may be coupled to or embedded within a flange that is either part of, or coupled to the shaft.

Figure 5C:
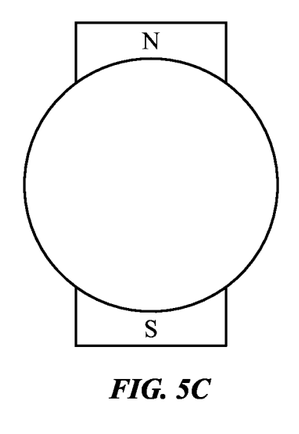
FIG. 5C illustrates a third arrangement of magnetic elements on a shaft of an optical encoder according to one or more embodiments of the present disclosure.

FIG. 5C illustrates a third example arrangement of magnetic elements according to embodiments of the present disclosure. As shown in FIG. 5C, the magnetic elements may be disposed on one or more flanges associated with the shaft. Further, each of the magnetic elements may have opposite polarities although this is not required. In some embodiments, such as discussed above with respect to FIG. 5B, each of the magnetic elements may have the same polarity and thus exert a repulsive force (rather than an attractive force) on an associated array of magnetic elements.

As with the example arrays of magnetic elements discussed above, the magnetic elements shown in FIG. 5C, may be embedded within the shaft, may be coupled to an end of the shaft, or may be coupled to, or embedded within, a flange that is either part of, or coupled to the shaft. It is also contemplated that the arrangement of magnets shown in FIG. 5A, FIG. 5B, and/or FIG. 5D may be combined with the embodiment shown in FIG. 5C.

In some embodiments, a crown of the optical encoder, or an actuation member of the optical encoder (e.g., actuation member 136) may include a coupling disk that includes various magnets that are configured to magnetically couple to the flanges and/or the other magnets present on the shaft. That is, the actuation member or other portion of the crown assembly may include one or more flanges or other surfaces that magnetically couple to the flanges shown in FIG. 5C. As discussed above, this magnetic coupling may be made through the hermetically sealed portion of the optical encoder.

Figure 5D:
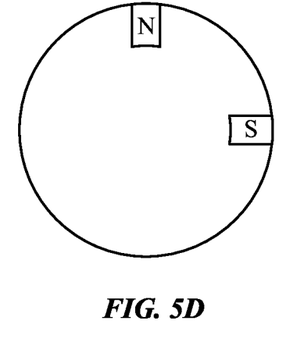
FIG. 5D illustrates a fourth arrangement of magnetic elements on a shaft of an optical encoder according to one or more embodiments of the present disclosure.

FIG. 5D illustrates a fourth example arrangement of magnetic elements according to one or more embodiments of the present disclosure. As shown in FIG. 5D, the magnetic elements may be arranged in various orientations having various polarities around a circumference of the shaft.

Although specific numbers, polarities and positions of the magnetic elements have been shown and described with respect to FIGS. 5A-5D, embodiments of the present disclosure are not so limiting. For example, although the figures show the magnetic elements disposed around a circumference of the shaft, the magnetic elements may be coupled to, or embedded in, various portions or areas on the shaft. Further, although a shaft is specifically discussed, the arrangements, orientations and polarities discussed above, may be used with the actuation member disclosed in the various embodiments herein.

Figure 6:
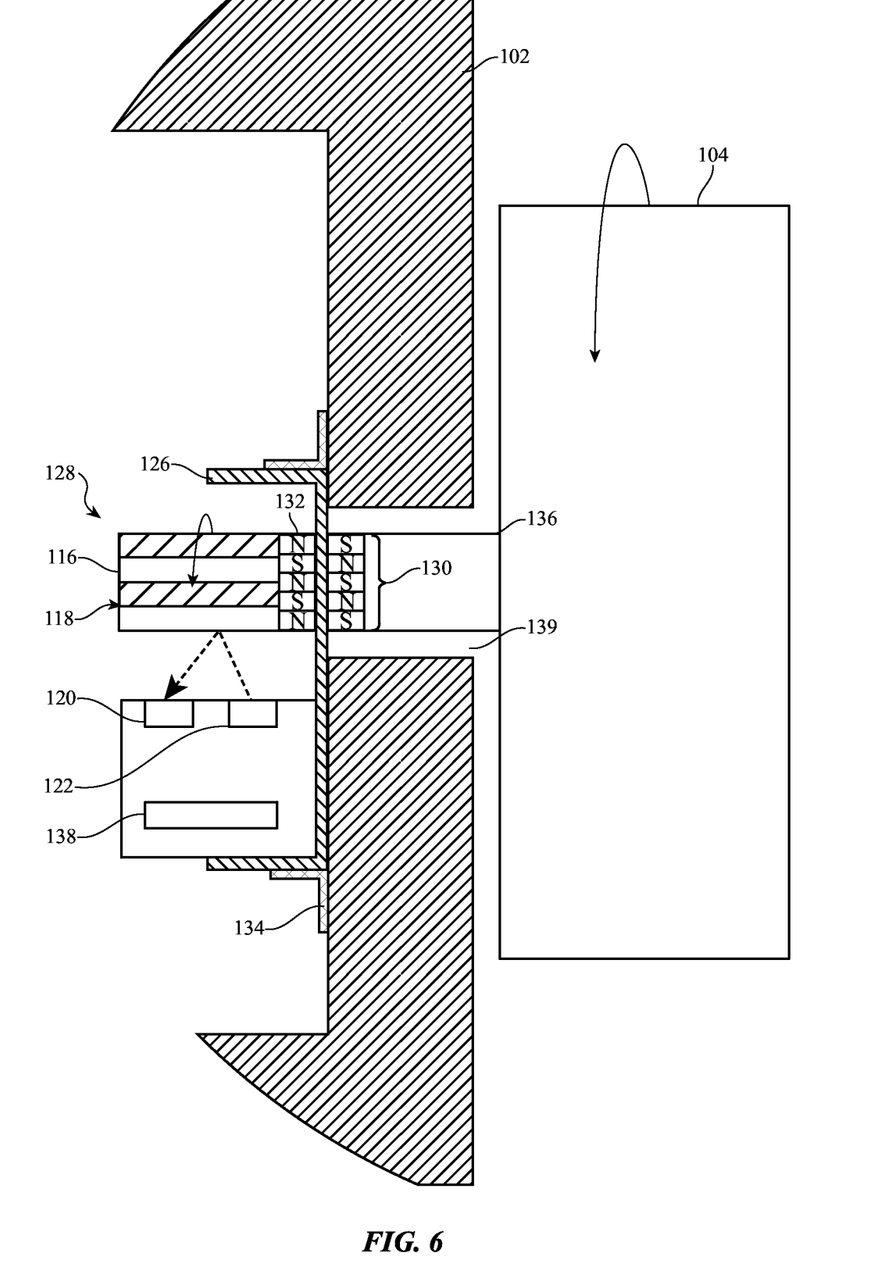
FIG. 6 illustrates an example optical encoder and crown assembly according to one or more alternative embodiments of the present disclosure.

FIG. 6 illustrates an example optical encoder 128 and crown assembly according to one or more alternative embodiments of the present disclosure. More specifically, FIG. 6 illustrates an optical encoder 128 disposed within a housing 102 of an electronic device. In some embodiments, the optical encoder 128 includes a shaft 116 having an encoding pattern 118 disposed along an axis of the shaft 116. The shaft 116 may also include an array of magnetic elements 132 either embedded within or coupled to at least one end of the shaft 116 such as described above. The optical encoder 128 may also include a light source 122 and a sensor or photodiode array 120 configured to receive light as it is reflected off of the encoding pattern 118.

In some embodiments, a hermetic seal may be placed on an interior sidewall of the housing 102 of the electronic device. The hermetic seal may be part of the enclosure 126. In other embodiments, a hermetic seal may be placed on or over various openings or apertures of the electronic device. The hermetic seal may be configured to prevent dust particles, water and other contaminants from contacting the photodiode array 120, the light source 122 and/or the shaft 116. The hermetic seal may entirely enclose the optical encoder 128 such as described above with respect to FIG. 3. In other embodiments, such as shown in FIG. 6, the hermetic seal may be used to seal off one or more openings in the housing 102 such as, for example, an opening 139 through with an actuation member 136 of the crown 104 is positioned in. Thus, multiple hermitic seals or multiple hermetic enclosures may be present in the electronic device.

Although the hermetic seal may only partially enclose the components of the optical encoder 128, the shaft 116 of the optical encoder may be at least partially coupled to the hermetic seal. For example, the shaft 116 may have a spindle (not shown) disposed through the center of the shaft 116 which enables the shaft 116 to rotate about its axis in response to actuation of the actuation member 136 and/or the crown 104.

More specifically, the array of magnetic elements 130 on the actuation member 136 may be magnetically coupled, through the hermetic seal, to the array of magnetic elements 132 on the shaft 116. Thus, as the crown 104 and/or the actuation member 136 moves or otherwise rotates, the array of magnetic elements on the crown or the actuation member 136 may exert a magnetic force on the array of magnetic elements 132 on the shaft 116 which causes the shaft 116 to rotate.

In some embodiments, a magnetic coupling disk may be used to secure one the actuator member through the hermetic seal. For example the magnetic coupling disk may be coupled to or associated with the crown. Further, the magnets on the coupling disk may be used to better secure the shaft 116 in the desired orientation.

In certain embodiments, the optical encoder 128 may include a correction module 138. The correction module 138 may be used to detect and/or correct any movement that occurs without the crown 104 or the actuation member 136 being actuated. For example, in some instances, because the shaft 116 may be positioned on a spindle, a bearing, an axel or the like (e.g., to enable the shaft 116 to rotate about its axis), the shaft 116 may inadvertently rotate due, for example, from movement of the device itself or other such factors.

In order to account for this movement, the correction module 138 may be coupled to, or otherwise receive information from, the photodiode array 120. More specifically, when the photodiode array 120 receives rotation information associated with the shaft 116, this information is sent to the correction module 138. The correction module 138 may then determine whether the movement of the shaft 116 has exceeded a minimum movement threshold.

The minimum movement threshold may be a minimum number of counts or lines of the optical encoder that have been read or are otherwise received by the photodiode array 120. Once the minimum movement threshold has been exceeded, a determination may be made that the movement of the shaft 116 is intentional (e.g., the shaft 116 has been rotated as a result of the crown 104 being rotated).

Although a specific example of the minimum movement threshold was given, embodiments of the present disclosure are not so limiting. In some embodiments, the minimum movement threshold may be a minimum degree of rotation of the shaft 116. In yet another embodiment, the minimum movement threshold may be associated with a threshold amount of speed of the rotation of the shaft 116. In still yet other embodiments, the minimum movement threshold may be a combination of two or more of the above mentioned types of movement characteristics.

Although specific types of movement characteristics are disclosed, other types of movement or thresholds may be used. For example, the shaft may be required to move or rotate a particular distance in a particular time prior to the device determining that the movement of the shaft 116 was intended. In yet another embodiment, a start-up zone may be indicated each time the shaft 116 ceases to move. Accordingly, the shaft 116 may be required to rotate past the start-up zone prior to any displayed content being altered as a result of the shaft 116 being rotated.

If the detected movement exceeds the threshold amount of movement, the correction module 138 may determine that the movement of the shaft is desirable and/or intended and process the movement accordingly. However, if the movement is below the threshold, the correction module 138 may determine that the movement is not intended or desirable. Accordingly, the information about the movement of the shaft is not processed.

Figure 7:
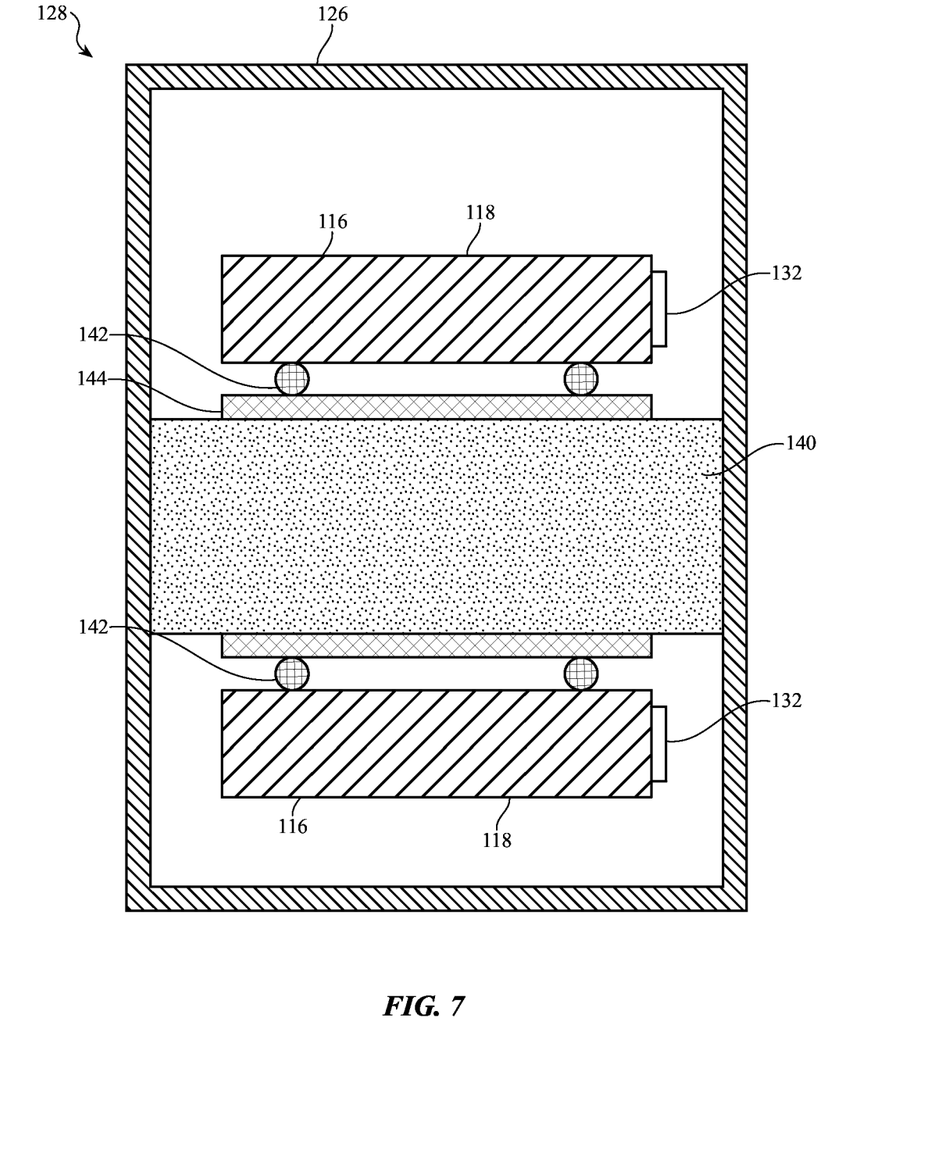
FIG. 7 illustrates a cross-section view of an example optical encoder according to one or more embodiments of the present disclosure.

FIG. 7 illustrates a cross-section view of an example optical encoder 128 according to one or more embodiments of the present disclosure. The optical encoder 128 may be any of the optical encoders shown and described above. Thus, although not shown in FIG. 7, the optical encoder 128 may include a photodiode array and a light source.

As shown in FIG. 7, the optical encoder 128 may include a stationary shaft or spindle 140. The spindle 140 may be secured within the enclosure 126 and enable the shaft 116 of the encoder to rotation around the spindle 140. As discussed above, the shaft 116 may include an encoding pattern 118 and an array of magnetic elements 132 such as described above. The shaft 116 may also have various striations, grooves, waves, scallops, channels and other surface markings that longitudinally and/or laterally extend along the shaft 116.

In some embodiments, the spindle 140 may be coupled to or otherwise at least partially surrounded by an intermediate layer 144 or contact plate. In some embodiments, the intermediate layer 144 may be a surface or layer that reduces or eliminates friction between the spindle 140 and the shaft 116.

The optical encoder 128 may also include various bearings 142. The bearings 142 may be disposed between the shaft 116 and the intermediate layer 144. The bearings 142 may also assist in enabling the shaft 116 to rotate around the spindle 140. The bearings 142 may also be used to hold the shaft in a desired position or maintain desired spacing with respect to the spindle 140 and/or the light source and photodiode array.

Figure 8:
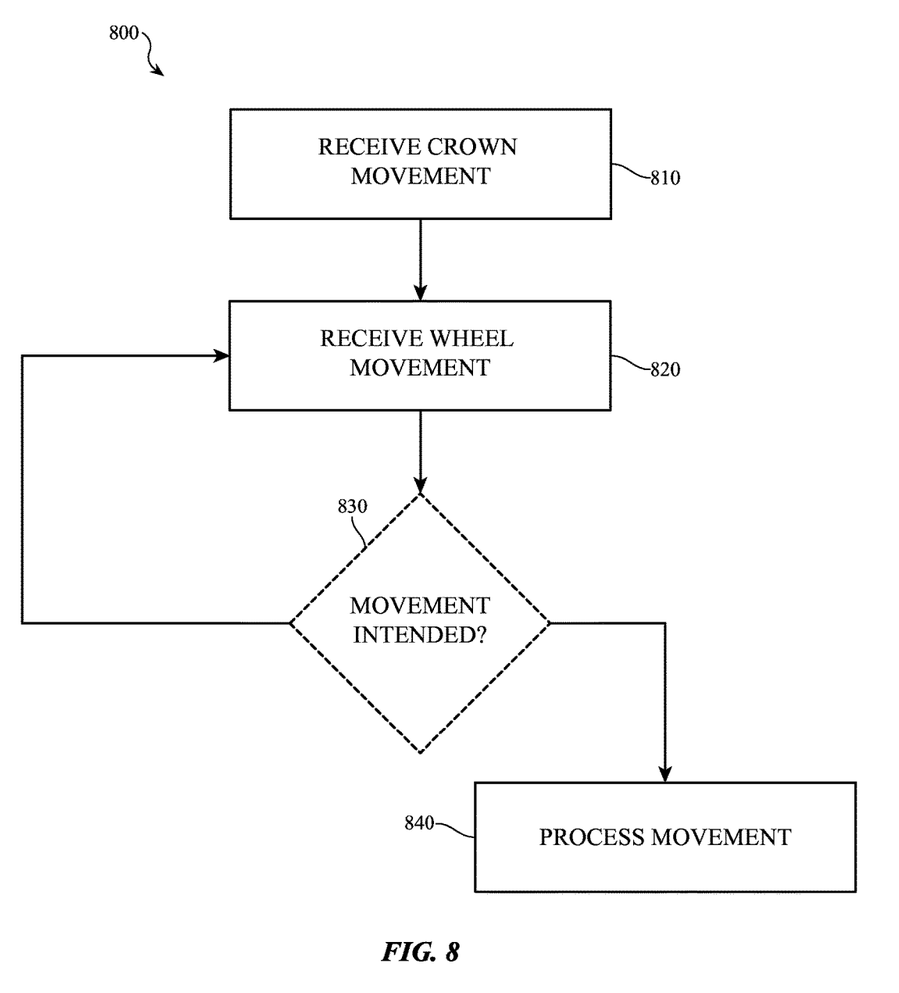
FIG. 8 illustrates a method for rotating a shaft of an optical encoder according to one or more embodiments of the present disclosure.

FIG. 8 illustrates a method 800 for rotating a shaft of an optical encoder according to one or more embodiments of the present disclosure. In some embodiments, the method 800 may be used for the various embodiments discussed above with respect to FIGS. 1-7. Further, each of the components and modules discussed and shown in these figures may be used in the method 800 described below.

Method 800 begins when a movement of a crown or other actuation member of the electronic device is received 810. In certain embodiments, the crown of the electronic device, or a portion of the crown of the electronic device, may include an array of magnetic elements disposed on at least one end. More specifically, a portion of the crown that includes the array of magnetic elements may pass through an opening within the housing of the electronic device and be coupled to or otherwise adjacent to an outer sidewall of an inner portion of the housing of the electronic device. In some embodiments, the inner portion of the housing may be an enclosure that hermetically seals one or more components of an optical encoder from dust, water and other contaminants.

The array of magnetic elements on the crown may be magnetically coupled to a second array of magnetic elements disposed on a shaft of the optical encoder. As the shaft of the optical encoder may be enclosed within the inner portion of the housing, the magnetic coupling between the crown and the shaft may need to pass through the inner portion of the housing.

However, due to the magnetic coupling between the shaft and the crown, when the crown is moved, flow proceeds to operation 820 and the shaft of the optical encoder is also moved. More specifically, the magnetic force that the array of magnetic elements on the crown exerts on the array of magnetic elements on the shaft causes the shaft to move in the same direction and with the same or substantially the same speed as the crown.

Flow may then (optionally) proceed to operation 830 in which a determination is made as to whether the movement of the shaft was intended. For example and as discussed above, the shaft may move due to various external forces. However, movement of the shaft may need to exceed a particular threshold prior to processing movement of the shaft of the optical encoder such as described above. If it is determined in operation 830 that the movement was not intended (e.g., the movement of the shaft is below the threshold), flow returns to operation 820.

However, if it is determined in operation 830 that the movement of the shaft was intended, operation 840 provides that the movement of the shaft is processed. For example, as the shaft of the optical encoder rotates and light is reflected off of the encoding pattern and received by a photodiode array, various degrees of movement of the crown may be detected. As a result, various images on a display of the electronic device may be updated.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

What is claimed is:

1. An optical encoder comprising:
   a housing portion;
   a shaft within the housing portion;
   a magnetic field source rigidly coupled to the shaft;
   an optical emitter operative to emit light onto the shaft;
   an optical detector operative to receive light reflected from the shaft;
   wherein rotation of the magnetic field source causes the shaft to rotate about an axis; and
   the magnetic field source is axially aligned with the shaft.

2. The optical encoder of claim 1, wherein:
   the magnetic field source is a first magnetic field source; and
   the first magnetic field source is magnetically coupled to a second magnetic field source external to the housing portion.

3. The optical encoder of claim 2, wherein rotation of the second magnetic field source causes rotation of the first magnetic field source.

4. The optical encoder of claim 1, wherein the housing portion is hermetically sealed.

5. The optical encoder of claim 1, wherein the housing portion comprises a sidewall that is adapted to be hermetically sealed to an interior sidewall of a device housing.

6. The optical encoder of claim 1, further comprising a bearing rotatably coupling the shaft to the housing portion.

7. The optical encoder of claim 1, wherein the first magnetic field source comprises an electromagnet.

8. The optical encoder of claim 1, wherein the first magnetic field source comprises a permanent magnet.

9. An electronic device comprising:
   an enclosure;
   an actuation member at least partially outside the enclosure;

a crown affixed to the actuation member, such that rotation of the crown causes rotation of the actuation member;

an optical encoder at least partially affixed to an interior sidewall of, and contained within, the enclosure and comprising:
   a shaft;
   a first magnetic field source rigidly coupled to the shaft;
   an optical emitter operative to emit light onto the shaft; and
   an optical detector operative to detect light reflected from the shaft;

a second magnetic field source coupled to the actuation member;

wherein rotation of the second magnetic field source causes rotation of the shaft around an axis.

10. The electronic device of claim 9, further comprising the actuation member rotatably coupled to an exterior sidewall of the enclosure and positioned opposite the interior sidewall of the enclosure.

11. The electronic device of claim 10, further comprising the second magnetic field source rigidly coupled to the actuation member such that rotation of the actuation member causes rotation of the second magnetic field source.

12. The electronic device of claim 10, wherein the actuation member comprises the crown.

13. The electronic device of claim 9, further comprising a securement mechanism configured to couple the enclosure to an internal housing portion of the electronic device.

14. A method for rotating an optical encoder disposed within a housing of an electronic device, the method comprising:

rotating an actuation member comprising a first magnetic field source about an axis, perpendicular to an outer sidewall of the housing of the electronic device;

rotating a shaft, disposed within the housing and configured to rotate about the axis, perpendicular to an inner sidewall of the housing that corresponds to the outer sidewall of the housing, the shaft comprising a second magnetic field source magnetically coupled to the first magnetic field source; and determining a change in rotation of the shaft as a result of the rotation of the actuation member; wherein the axis extends through the first magnetic field source and second magnetic field source.

15. The method of claim 14, wherein the shaft is hermitically sealed from the actuation member.

16. The method of claim 14, wherein the actuation member is rigidly coupled to a crown.

17. The method of claim 14, wherein determining a change in the rotation of the shaft comprises processing light reflected from a surface of the shaft.

18. The method of claim 17, further comprising determining whether movement of the shaft is above a movement threshold.

19. The method of claim 14, wherein determining a change in the rotation of the shaft comprises processing a change in a luminance of light reflected from an encoding pattern disposed along the shaft.

20. The method of claim 14, wherein determining a change in the rotation of the shaft comprises determining an orientation of the second magnetic field source.

* * * * *

UNITED STATES PATENT AND TRADEMARK OFFICE
CERTIFICATE OF CORRECTION

PATENT NO. : 9,829,350 B2
APPLICATION NO. : 14/796895
DATED : November 28, 2017
INVENTOR(S) : Prashanth S. Holenarsipur et al.

Page 1 of 1

It is certified that error appears in the above-identified patent and that said Letters Patent is hereby corrected as shown below:

In the Claims

Claim 7, beginning at Column 14, Line 60 should read:
7. The optical encoder of claim 1, wherein the magnetic field source comprises an electromagnet.

Claim 8, beginning at Column 14, Line 62 should read:
8. The optical encoder of claim 1, wherein the magnetic field source comprises a permanent magnet.

Signed and Sealed this
Twenty-fourth Day of April, 2018

Andrei Iancu
*Director of the United States Patent and Trademark Office*